United States Patent
Han et al.

(10) Patent No.: US 8,392,470 B2
(45) Date of Patent: Mar. 5, 2013

(54) METHOD FOR GRASPING INFORMATION OF WEB SITE THROUGH ANALYZING STRUCTURE OF WEB PAGE

(75) Inventors: Man-Jin Han, Seoul (KR); Tae-Gyoon Kim, Seoul (KR); Moon-Sung Choi, Seoul (KR)

(73) Assignee: Isforu Co., Ltd., Seoul (KR)

( * ) Notice: Subject to any disclaimer, the term of this patent is extended or adjusted under 35 U.S.C. 154(b) by 243 days.

(21) Appl. No.: 12/602,069

(22) PCT Filed: May 29, 2008

(86) PCT No.: PCT/KR2008/003023
§ 371 (c)(1),
(2), (4) Date: May 28, 2010

(87) PCT Pub. No.: WO2008/147126
PCT Pub. Date: Dec. 4, 2008

(65) Prior Publication Data
US 2010/0235402 A1 Sep. 16, 2010

(30) Foreign Application Priority Data
May 29, 2007 (KR) .......................... 10-2007-0052016

(51) Int. Cl.
*G06F 7/00* (2006.01)
*G06F 17/30* (2006.01)
(52) U.S. Cl. ..................................... 707/802
(58) Field of Classification Search ................... 707/802
See application file for complete search history.

(56) References Cited

U.S. PATENT DOCUMENTS

| | | | |
|---|---|---|---|
| 6,014,638 A | 1/2000 | Burge et al. | |
| 2002/0089532 A1* | 7/2002 | Cohen et al. | 345/736 |
| 2002/0147772 A1* | 10/2002 | Glommen et al. | 709/203 |
| 2003/0023715 A1* | 1/2003 | Reiner et al. | 709/224 |
| 2003/0053420 A1* | 3/2003 | Duckett et al. | 370/252 |
| 2004/0039776 A1* | 2/2004 | Ballard | 709/203 |
| 2004/0103389 A1* | 5/2004 | Song et al. | 717/107 |
| 2004/0158429 A1* | 8/2004 | Bary et al. | 702/183 |
| 2004/0205514 A1* | 10/2004 | Sommerer et al. | 715/501.1 |

(Continued)

FOREIGN PATENT DOCUMENTS
JP 11-345202 12/1999
KR 10-2003-0040263 5/2003

OTHER PUBLICATIONS
International Search Report for PCT/KR2008/003023 dated Aug. 13, 2008.

*Primary Examiner* — Robert Beausoliel, Jr.
*Assistant Examiner* — Nicholas Allen
(74) *Attorney, Agent, or Firm* — Morgan, Lewis & Bockius LLP

(57) ABSTRACT

The present invention provides a method for determining website information through web page structure analysis, including: generating, when a web page starts to move, a movement start message that contains IDs issued to identify respective web pages; generating, when a web page starts to move, a movement terminating message that contains URL information about a corresponding web page and information to determine whether a corresponding web page is a main page or a subpage through the ID; generating, when all web pages have been loaded, a document terminating message containing information that analyzes which of the web pages has been moved; collecting the messages and generating a message database; and determining the website information of a specific user's visiting state and access states of the website, based on analysis of the message database.

19 Claims, 6 Drawing Sheets

U.S. PATENT DOCUMENTS

| | | |
|---|---|---|
| 2004/0268233 A1* | 12/2004 | Okumura et al. ............. 715/513 |
| 2005/0232480 A1* | 10/2005 | Swift ............................ 382/165 |
| 2006/0004775 A1* | 1/2006 | Kobayashi et al. ............ 707/10 |
| 2007/0100680 A1* | 5/2007 | Kumar et al. .................. 705/10 |
| 2008/0046562 A1* | 2/2008 | Butler ........................... 709/224 |
| 2008/0072239 A1* | 3/2008 | Liang et al. ................... 719/311 |
| 2008/0235368 A1* | 9/2008 | Nagaraj et al. ................ 709/224 |

\* cited by examiner

B: start moving to page

N: terminate moving to page

D: terminate document

METHOD FOR GRASPING INFORMATION OF WEB SITE THROUGH ANALYZING STRUCTURE OF WEB PAGE

CROSS REFERENCE TO RELATED APPLICATIONS

This Application is a United States National Stage Application filed under 35 U.S.C. §371 of PCT Patent Application Serial No. PCT/KR2008/003023 filed on May 29, 2008, which claims the benefit of and priority to Korean Patent Application Serial No. 10-2007-0052016 filed on May 29, 2007, the disclosures of all of which are hereby incorporated by reference in their entirety.

TECHNICAL FIELD

The present invention relates to web page structure analysis. More particularly, this invention relates to a method for determining website information through web page structure analysis that can analyze web page structures as a tracking program, previously installed to clients and servers, generates a particular message every time a web page is accessed and moved. This method can determine access to a particular web page and web surfing paths by users who are using a client-server system and then make a database using the results, thereby determining information such as access states to websites, fields of interest to users, and improving customer relationship management (CRM) and target customer management.

BACKGROUND ART

In recent years, log analysis has been widely used to detect information, such as a user's access state to a particular web page. Log analysis provides information to determine a website's state, based on information analysis, such as the number of visitors, the number of page views, cookie values, etc.

Log analysis is classified into (1) a log file inserting method that directly inserts a log file to a web server that manages a particular web page, generates signals, such as an access in a log file, forms data based on the signals, and analyzes the data, (2) a code inserting method that inserts scripts and/or codes into a website, forms data based on the code value, and analyzes the data, and (3) an indirect log analysis method that analyzes external statistical data.

The log file inserting method is disadvantageous in that, when the number of users (who access the server) is increased, the amount of log file data becomes so larger that this work must be entrusted to a specialized analysis organization. The code inserting method is suitable for a website accessed by a relatively small number of visitors, but it is disadvantageous in that the volume of work becomes so large, compared with the log file inserting method, if more than a predetermined number of visitors access such a website.

Since the log analysis is performed in such a way that codes and/or log files must be inserted into a website, it may be used by a website manager to check only the use state of the website he/she is managing. That is, the conventional log analysis can perform only a limited manger-centered analysis.

When an manager wants to strategically determine use states of competitor's websites as well as his/her own website, to detect which websites are popular and which of the websites and web pages users have higher interest, which websites are sponsored by advertisers, and to analyze CRM through users' web surfing cycles, the manager must determine access states to websites other than the manager's own website. However, the conventional log analysis, which provides manager-centered analysis, does not obtain information about the use state of other websites, or information about customer's preferred websites, etc.

AS web marketing has developed rapidly, the conventional log analysis enables a website manager to determine the access state of only the website he/she is managing, but does not allow the manager to establish advanced marketing strategies, compared to the competition. Furthermore, the conventional log analysis does not propose a method for rapidly handling users' requests. Therefore, a new method is required to analyze websites.

In response to this request, for example, a method has been proposed to determine web surfing states and web surfing paths in terms of users, not a website managing manager. That is, the method can extract information about website access based on a particular group of users.

In order to determine whether a specific user accesses a particular website and to determine the user's web surfing path, preceding processes must performed: the structure of a particular web page of the website accessed by the user must be analyzed; and an access signal to match the analyzed web page structure must be generated and all signals must be also processed.

In general, a web page is designed as a single page or as a complex page that uses frameset tags and/or iframe tags.

A single page is a type of web page linked to a single web server using only one URL. That is, a single page has the most general structure and is an html page that does not use tags, such as frameset and iframe. A complex page is a type of web page linked to one web server and/or a plurality of web servers using different URLs. A complex page is a web page using tags, such as frameset and iframe. A complex page contains a main page and subpages. The main page distinguishes page navigation and refers to a page corresponding to a URL in the address bar. The sub-pages are created by frameset and/or iframe tags in the main page.

Internet websites are all composed of a single web page and/or a complex web page. Theses web pages are linked to respective websites so that users can move between the websites. Users can move from one web page to another during the download of web pages. User can also move from one web page to another as one web page is interrupted before being completely downloaded.

In order to analyze a web page structure, the conventional method must first resolve the following problems:

1) Web page structures must be precisely analyzed according to the types of web pages, since web pages are designed by a single web page and/or a complex web page and these web pages are repeatedly moved according to a user's web surfing;

2) Sub-pages in a complex page must be recognized, since the complex page contains subpages and all of the pages can be completely loaded only if the subpages are completely loaded;

3) When web pages are not moved but refreshed, only contents in the pages are changed. Therefore, it must be determined whether the contents are identical to the previous contents when the web pages are refreshed.

4) When only frames in web pages are changed, it is determined whether the frames are arbitrarily selected and changed by a user or whether they are changed according to a periodical operation.

5) Since a single page does not have any additional subpages, a method must be sought to determine whether a single page is refreshed, where the method is a method other than the method to check whether a subpage exists.

Therefore, there is a case where a manager intends to check a movement state of user-centered web pages to determine use states of a variety of websites that are not operated by the manager. In that case, in order to more precisely determine a user's movement state between web pages, a method is required to precisely analyze the web page structure and to determine a variety of movement patterns, such as the downloading all of web documents corresponding to the web pages that a user accessed, refreshing web pages, irregular movement, etc.

DISCLOSURE OF INVENTION

Technical Problem

The present invention solves the above problems, and provides a method that does not insert a log file or a script into a web server but processes and analyzes information about user's website use state in order to determine use states of a variety of websites not operated by the manager, which does not include a specific manager's managing website, and generates and processes web page movement messages for respective web pages when web pages are moved in order to track a user's web page movement path, assuming that information about a use state and how a user uses websites should be obtained.

The present invention further provides a method that subdivides a web page movement message with a time-sequence and manages subdivided messages according to respective web page movement styles in order to obtain a high level of web page movement information, which is identical to the levels of other web pages that are established by different structures, such as a signal web page and/or a complex web page.

The present invention further provides a method that determines the movement of a single web page according to whether a browser title is changed when a web page is refreshed and determines the movement of a complex page according to whether a subpage is changed when a web page is refreshed.

The present invention further provides a method for obtaining a variety of information by sharing web page use information, such as web page movement paths between users who use track programs that track user movement paths, where the track programs are installed to clients and servers which communicate with each other.

The present invention further provides a method for transmitting information obtained by the track programs to an additional management server and analyzing users' web page movement paths, respectively and systematically, so that the information can be utilized as a variety of web marketing data.

The present invention further provides a method for reproducing a precise location of an indicator attached to web pages, recording information about the reproduced location, etc. in a management server, and managing them in association with an indicator executing program.

Technical Solution

In accordance with an exemplary embodiment of the present invention, the present invention provides a method for determining website information through web page structure analysis, including: generating, when a web page starts to move, a movement start message that contains IDs issued to identify respective web pages; generating, when a web page starts to move, a movement terminating message that contains URL information about a corresponding web page and information to determinate whether a corresponding web page is a main page or a subpage through the ID; generating, when all web pages have been loaded, a document terminating message containing information that analyzes which of the web pages has been moved; collecting the messages and generating a message database; and determining the website information of a specific user's visiting state and access states of the website, based on analysis of the message database.

Advantageous Effects

As described above, the method for determining website information through web page structure analysis, according to the present invention, has the following advantages:

1) Since website information and website structure is determined by analyzing a user's web surfing path, it does not require the insertion of a log file or a script into a web server and can determine all use states of websites managed by other managers as well as a use state of a website managed by a specific manager;

2) it can acquire the structure and information of the website and a relatively high level of web page movement information, where the level is identical in any web pages such as a single web page and/or a complex web page, which are different from each other in structure;

3) it enables programs for web page analysis to be communicated therebetween, so that users using the programs can share web page use information, such as information about web page movement path, etc., with each other and thus can acquire a variety of information;

4) it can determine, in detail, whether a single page/a complex page is refreshed and whether a part of subpage is altered; and 5) it can perform a precise reproduction of an indictor attached to a web page, which was difficult to perform in the conventional browser structure due to the association with an indictor, can allow the indicator to be precisely realized over the web, and can allow special and various information about target user advertisements and CRM data to be obtained.

BRIEF DESCRIPTION OF THE DRAWINGS

The features and advantages of the present invention will be more apparent from the following detailed description in conjunction with the accompanying drawings, in which.

BRIEF DESCRIPTION OF SYMBOLS IN THE DRAWINGS

Figure 1:
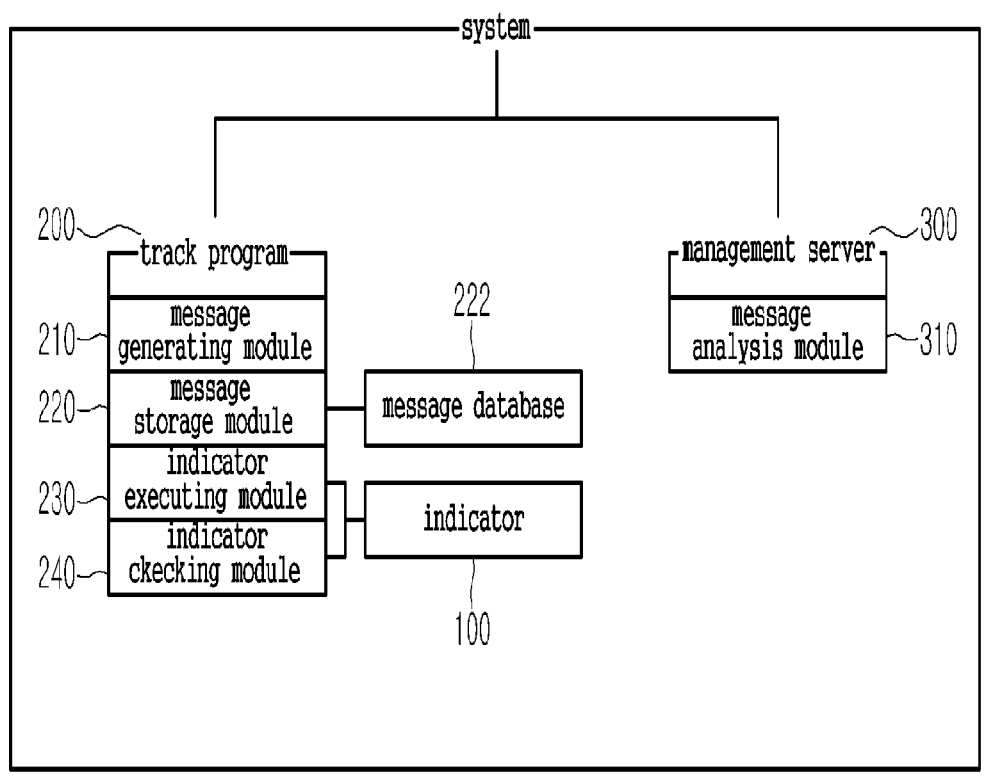
FIG. 1 is a schematic block diagram illustrating a system adapted to a method for determining website information through web page structure analysis, according to the present invention.

100: indicator
200: track program
210: message generating module
220: message storage module
230: indicator generating module
240: indicator checking module
300: management server
310: message analysis module

BEST MODE FOR CARRYING OUT THE INVENTION

The present invention provides a method for determining website information through web page structure analysis, including: generating, when a web page starts to move, a movement start message that contains IDs issued to identify respective web pages; generating, when a web page starts to move, a movement terminating message that contains URL information about a corresponding web page and information to determinate whether a corresponding web page is a main page or a subpage through the ID; generating, when all web pages have been loaded, a document terminating message containing information that analyzes which of the web pages has been moved; collecting the messages and generating a message database; and determining the website information of a specific user's visiting state and access states of the website, based on analysis of the message database.

Mode for the Invention

Hereinafter, embodiments of the present invention are described in detail with reference to the accompanying drawings. In the drawings, the same or similar elements are denoted by the same reference numerals even though they are depicted in different drawings.

FIG. 1 is a schematic block diagram illustrating a system adapted to a method for determining website information through web page structure analysis, according to the present invention.

The term 'web page' is also called a 'page' in the present application. The term 'work ID' is also referred to as a 'thread ID' or an 'ID.'

The present invention provides techniques for obtaining website use information and a log analysis result by analyzing a web page structure and by determining user's web page movement path. To this end, a program for analyzing a user's web page movement paths, which is called a track program 200 in the present invention, must be installed to clients and servers that allow users to access the Internet.

The track program 200 can be installed to the clients and servers without the user realizing.

This track program 200 can be installed to the clients and servers to achieve a variety of strategy. For example, an indicator 100, an indicator executing module 230 and a track program 200 were disclosed in Korean Patent No. 705474, owned by the present applicant, entitled SYSTEM FOR DISPPLAYING AND MANAGING INFORMATION IN WEB PAGES USING INDICATOR. In that disclosure, as the indicator executing module 230 that is implemented to use the indicator 100 is installed in the track program 200, the track program 200 can be naturally installed in the clients and servers, together with the indicator executing module 230. Here, the indicator 100 refers to an information display window that collects a variety of information so that the information can be stacked around a particular content of web pages and shared by users.

Figure 2:
FIG. 2 is a web page to which an indicator is attached.

FIG. 2 is a web page to which an indicator 100 is attached.

The indicator 100, according to the present invention, refers to a part that corresponds to documents recorded in web pages, pictures, moving images, etc. For example, this indicator 100 serves as the post-it note of 3M's Art Fry, which is temporarily attached to notebooks, walls, desks, etc. That is, the indicator 100 is an online memo note.

The indicator 100 is a block space with a certain size in which a comment, an additional explanation, a memorandum, etc. can be added regarding the contents of a corresponding web page. The indicator 100 can be loaded as occasion demands. Web pages can be also activated while the indicator 100 is displayed.

The indicator 100 includes information such as contents, a location attached to a web page, a URL address of a web page to which the indictor 100 is attached, etc. The indicator-related information is stored in the indicator executing module 230 and transmitted to the management server 300.

The management server 300 sorts the information from the indicator, such as the existence/location/content, stores as a database, and manages it. This databased indicator information makes it possible to determine the precise location of the indicator attached to a web page, to extract specific information about users who are using the indicator, and to use this information as a target user advertisement and CRM data. On the contrary, the conventional browser has difficulty determining a web document corresponding to a web page to which an indicator is additionally attached.

When a user recognizes the installation of the track program 200, a user web page movement searching function, which is the main focus of the present invention, can be arbitrarily restricted to protect user privacy.

Referring to FIG. 1, the website information system using web page structure analysis includes: a management server 300 including a message analysis module 310 that manages and analyzes a message database 222; and a track programs 200 that are installed in the clients and servers to track a user's web surfing path, prepare data for analyzing web page structure analysis, and include an indicator executing module 230 and an indicator checking module 240.

The track programs 200 serve to determine a web page movement path which is the main idea of the present invention. The track programs 200 include a message generating module 210, a message storage module 220, an indicator executing module 230, and an indicator checking module 240.

The message generating module 210 serves to generate three web page movement messages based on movement processes, which will be described later. The message storage module 220 serves to store the web page movement messages, database them as a message database 222, and transmit them to the management server 300. The indicator executing module 230 serves to generate and execute the indicator 100 and collect information about the indicator 100. The indicator checking module 240 serves to determine whether the indicator 100 exists in the moved web page.

The management server 300 receives the messages from the message database 222 and stores and manages them. The management server 300 analyzes the message database 222 through the message analysis module 310 to analyze the web page structure and the website structure including the web page. The management sever 300 calculates a variety of statistical access data based on users and web pages. The management server 300 receives indicator information from the indicator checking module 240 and collects and manages information, such as the existence and location of the indicator 100 attached to the web page.

Figure 3:
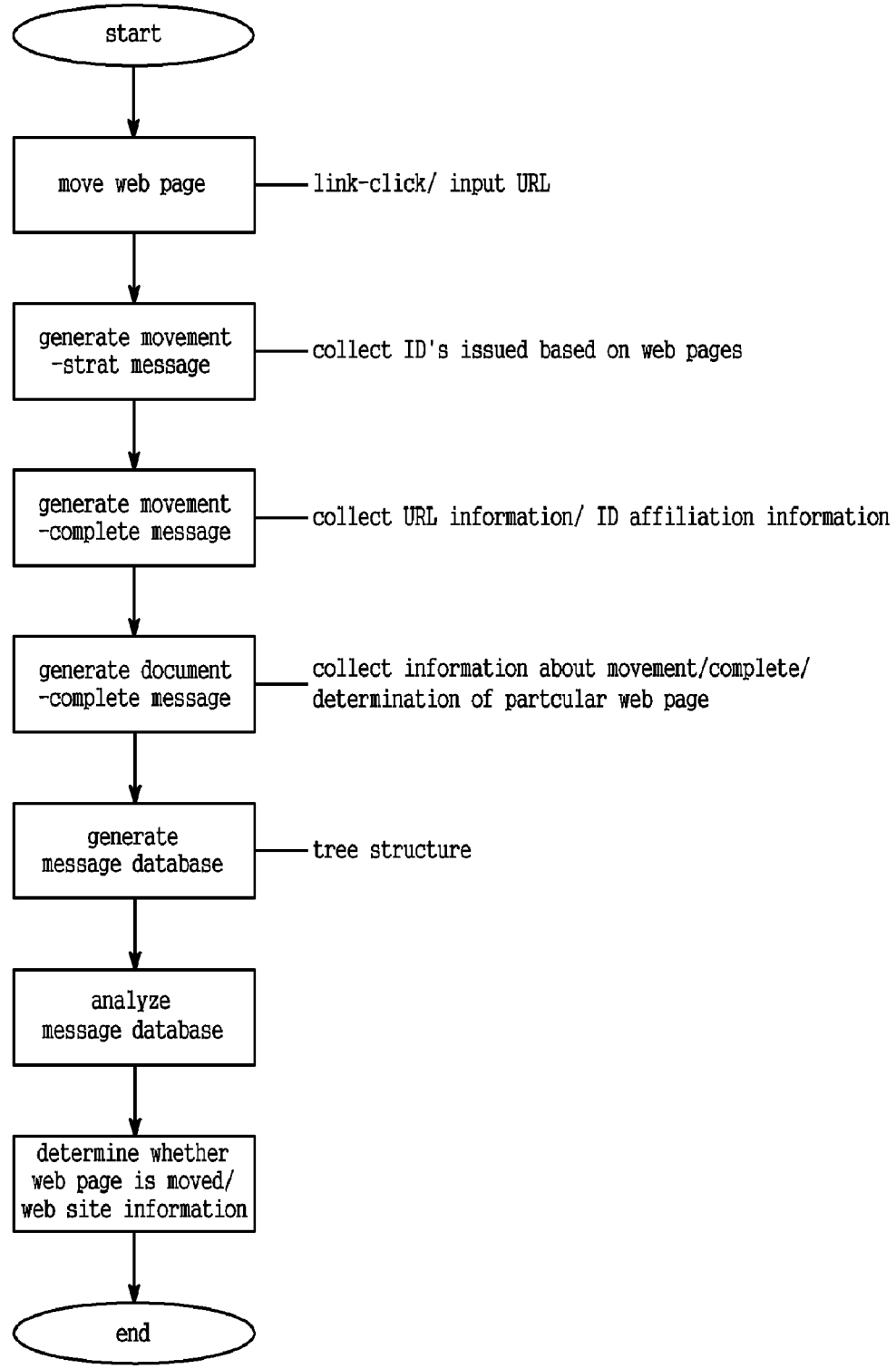
FIG. 3 is a flow chart describing a method for determining website information through web page structure analysis, according to the present invention.

FIG. 3 is a flow chart describing a method for determining website information through web page structure analysis, according to the present invention.

As shown in FIG. 3, the method sequentially generates three page movement messages from starting a web page movement to terminating the movement.

The web page movement messages refer to the following messages, which are part of the messages continuously generated from when a user executes a browser until the browser is terminated.

1) A page movement starting message, referring to a message that is generated in a message generating module when a user directly inputs a URL in the URL address bar or clicks a web page link and accordingly a web page starts to move. This page movement starting message makes it possible to obtain one thread ID (which is hereinafter called an ID or a work ID) for all web pages. If a web browser is initially linked to a particular web page, a new thread ID can be obtained, which will be described in detail later.

2) A page movement terminating message, referring to a message that is generated immediately before a web page is displayed on a monitor after information about all moved web pages is received. This page movement terminating message includes URL information, ID information, etc.

3) A document terminating message, referring to a message that is generated after all work using web pages has been terminated. The document terminating message is generated every time one thread has been terminated. The document terminating message is required to determine the subpage termination, the termination of all threads, etc.

This message is utilized to determine a case where a user recognizes a page as a different page because the page has been moved and then is only partially altered by iframe tags or frameset tags, etc. Here, page movement may be terminated as the highest thread is generated last.

Additionally, whether an indicator exists is determined at the step of generating the document terminating message.

Since these three web page movement messages are generated according to the web page movement process (in which the page movement sequence is different depending on whether the web page is a single page or a complex page, which will be described later), they are utilized to determine a web page's structure.

Here, the term work ID (thread ID or ID) refers to a web page identification number, which is utilizes to recognize a precise source of subpages when page terminating messages/document terminating messages are generated randomly in each subpage.

In order to obtain a generating message of a browser, a COM message invoke function must be used. A browser generates one thread per URL and independently performs respective page movements. Consequently, web page movement is performed not by a serial movement method, but by a parallel movement method, which will be described in detail with reference to the drawings. Therefore, when all movement messages are generated to determine the web page structure, it must be determined which thread (or the highest ID) each movement message, i.e., a particular ID belongs to and which state each movement messages, i.e., a particular ID belongs to.

In order to determine those states, the method according to the present invention generates movement messages for generating and extracting a variety of web page information. The generation sequence of movement messages is described in detail below.

When a web page starts to move, a page movement start message is generated and a thread ID (ID or work ID) of a corresponding URL and other additional information can be obtained. If this page movement start message is initially generated after the browser has started, the highest work ID that can discriminate a web page movement can be obtained.

After information about a corresponding page has been received, a page movement terminating message is generated. Here, the tread that the message corresponds to is determined. More specifically, through the ID generated in the step of generating the page movement start message, the checking process is achieved by analyzing to which ID of a main page and/or the highest page the web page that has currently moved is related.

Furthermore, at the step of generating a page movement termination message, a precise URL address can be obtained by extracting a corresponding URL. The reason why a URL is not extracted when a page movement starts is because the URL information generated when a page movement starts may include an incorrect URL because of user's inputting operation or a URL related system of a web server, which manages a corresponding website, may arbitrarily alter the information. Due to these reasons, a URL is extracted when a page has moved, i.e., after web page information is fixed and then received.

While these two messages are generated, using information about an ID per each movement, a URL, the ID generation sequence, etc., a page structure is analyzed by generating a message database analyzed in a tree structure.

When the document terminating message is generated, it is determined which of the web pages a work is terminated in a message database composed of a web page tree structure that has been previously determined (if the website is first visited, tree structures for websites visited after the checking operation will be newly generated). Web page terminating work is processed when by a case where the internal page is terminated or by a method for checking whether the highest level of work is terminated.

After that, these three movement messages for the respective web pages are generated as a message database and this message database is transmitted to the management server. Through the message database, the management server can analyze a website structure, compiles statistical data on the main page visit and the subpage visit, use information about website access states, such as visit time, and use CRM data and customer management data, which are obtained by analyzing a specific user's website visit state. Furthermore, through these processes, the management server can obtain data for performing a target advertisement for users who use an indicator.

Figure 4:
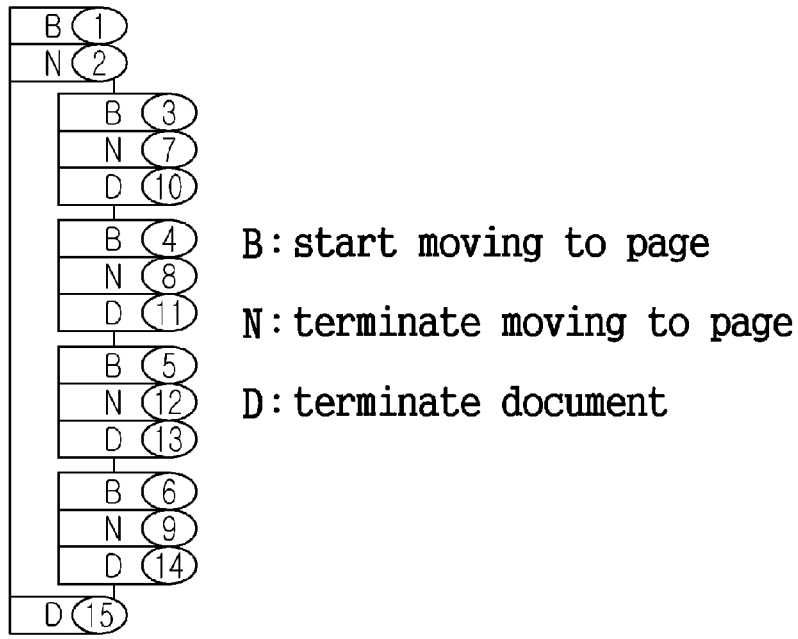
FIG. 4 is a view describing a sequence of messages generated when web pages are moved, according to the present invention.

FIG. 4 is a view describing a sequence of messages generated when web pages are moved, according to the present invention.

Before describing FIG. 4, a web page structure forming a website is explained.

Web page structure refers to a page structure displayed on a client screen and is classified into a single page structure composed of one URL and a complex page structure composed of a plurality of URL addresses. The complex page structure is classified into a main page (the highest page) and a subpage. The main page is a page corresponding to an URL that can discriminate page movements and is displayed in the address bar. The subpage is generated in the main page using iframe tags or frameset tags.

The main page refers to a page that can discriminate page alteration. A page without the use of frame has only one page matching one URL. A main page using frameset tags is composed of only frame tags that are composed of URL of internal page and all contents displayed on the client screen are processed in the internal frame. According to a well-known method in a complex page, although the basic page alteration can be checked by the main page alteration, it is impossible to check the internal page alteration or the refresh function, etc.

The subpage refers to all pages contained under the main page. Page movement discrimination cannot be determined by only a subpage. However, the subpage may be used as an indirect method that determines page movement discrimination. For example, through information about movement/alteration of a subpage, it can be checked whether a complex page is refreshed or an internal page is altered.

Therefore, whether the subpage is altered is important to a complex page. The method according to the present invention generates three types of movement messages for a subpage and detects the relationship between the main page and the subpages, thereby precisely determining the whole website structure.

As shown in FIG. 4, when a page is moved to a complex page, a page movement start message of the main page is first generated and then a page movement terminating message is generated while internal contents are loaded. Here, when the page contains other subpages, page movement start messages/page movement terminating messages/document terminating messages of the subpages are generated. The page movement start messages are sequentially generated. Other movement terminating messages/document terminating messages are generated at random.

This is because one thread is generated in each page and simultaneously page movement is performed, so the message generation sequence does not wait until the internal contents have been loaded. More specifically, in a state including an ID issuing step at only a page movement start time where a thread is allocated, page movement start messages are sequentially generated to secure an ID and then other messages are generated according to the mount of codes of subpages and loading time. After that, when the document terminating messages for the main page are finally generated, it is ascertained that a corresponding page movement is terminated and it is analyzed whether it is the main page and/or the subpage through the web page structure, i.e., URL information, and the relationship of IDs issued from other web pages.

Figure 5:
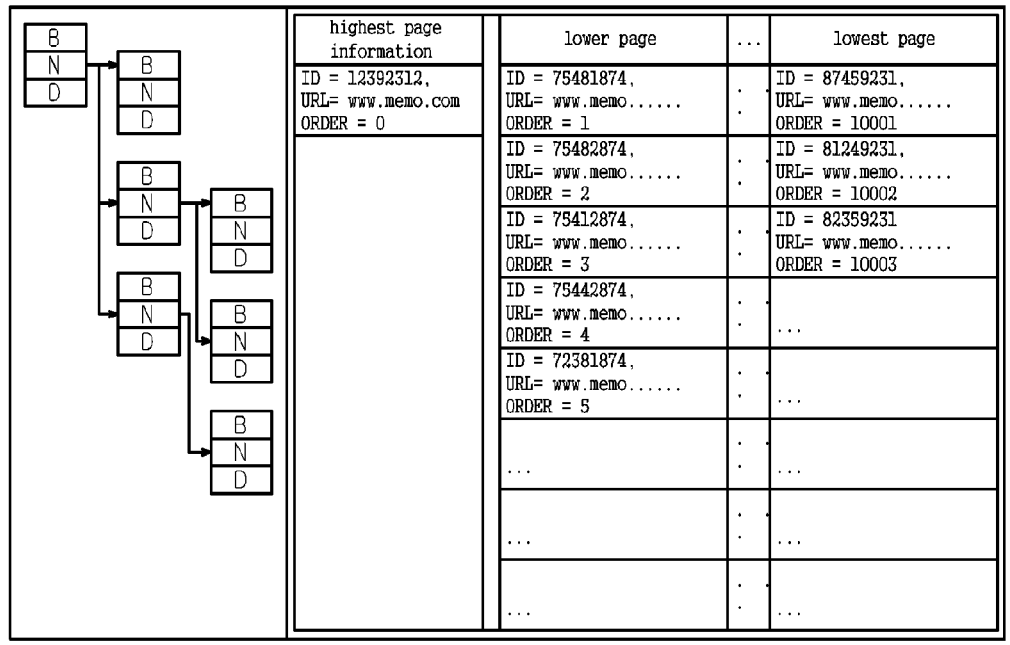
FIG. 5 is a view describing a tree structure of web pages generated through moving messages, according to the present invention.

FIG. 5 is a view describing a tree structure of web pages generated through movement messages, according to the present invention.

A web page tree structure is information from a message database that is hierarchically arranged based on web pages. That is, the web page is hierarchically represented by a tree-branch structure, so that the main information and sub-information can be arranged in a branch structure. Here, this structure is extended in a tree-branch format from the highest page (main page) to the lower page (subpages).

When a message database is prepared by the tree-structure and a web page is analyzed, the amount of work time can be reduced and the positions and information of the main page and subpages can also easily be determined. Also, it is simple to determine changes to pages, such as a new page addition, a page deletion, etc. In addition, regarding a website that has been already accessed, its structure, i.e., a tree structure, is also stored. Therefore, the method according to the present invention can rapidly process information by comparing this information with such a stored tree structure.

In order to derive the web page structure through the page movement messages, IDs for discriminating pages are issued at a step of generating a page movement start message. These IDs are stored in the page tree structure.

If a particular web page is moved to the first page, the work ID, generated at a step of generating a movement start message, is maintained until the movement work of the browser is terminated, thereby securing the identification for the movement work.

The work IDs of pages other than the ID generated by the first movement are all generated at random. The work IDs are newly generated when a page is moved and when a page is refreshed.

Therefore, the management server compares these IDs and determines whether URL information of an existing ID is consistent with that of a new ID, so that access numbers to a particular web page and the determination as to whether a web page is moved can be determined.

However, when only part of a complex page is altered, the work ID is not be issued.

According to this principle, when a web page is altered, it is determined whether a page is altered by a general movement. In addition, when a part of page is altered, it is determined whether the page must be recognized as a new page.

In order to analyze a web page structure, data forming a message database are generated and recorded. The data may be ID, URL information, information about movement message generating sequence, etc. and are described in detail in terms of their use purpose.

When a page movement start message is generated, it is checked whether the highest page ID of a corresponding page is previously stored in order to analyze whether the page corresponds to a new access state. If the highest page ID is not stored, it means that a browser first starts and accordingly the initial work ID is not issued. Therefore, a new highest page ID is issued.

If the highest page ID has been already issued, there are two cases.

When the initial ID is generated again, it is determined that a new web page movement begins. On the contrary, when other ID other than the initial ID is generated, it is determined that a subpage in a complex page starts but a page does not move.

Regarding a single page, since a page movement cycle is performed only once and thus subpage information does not exist, the web page structure can be analyzed using only ID information. Here, the URL of the single page can be used as additional information.

Regarding a complex page, it is difficult to determine whether the page is refreshed or a part of page is altered using only a page ID. Therefore, information such as the URL of the page and page generation sequence other the ID must be generated and recorded.

That is, since subpages under the main page exist in the complex page, information, such as the subpage work ID, the subpage URL, subpage generating sequence, etc., other than the ID information about the main page, is recorded and managed in the page tree structure. After comparing the IDs, comparing the URL's, and analyzing information about the subpage generating sequence, it can be determined whether the complex page is moved and/or the complex page structure can be determined. Therefore, the complex page requires the URL information and the information about the subpage generation sequence.

The following description provides procedures for checking movements of a single page and a complex page.

Figure 6:
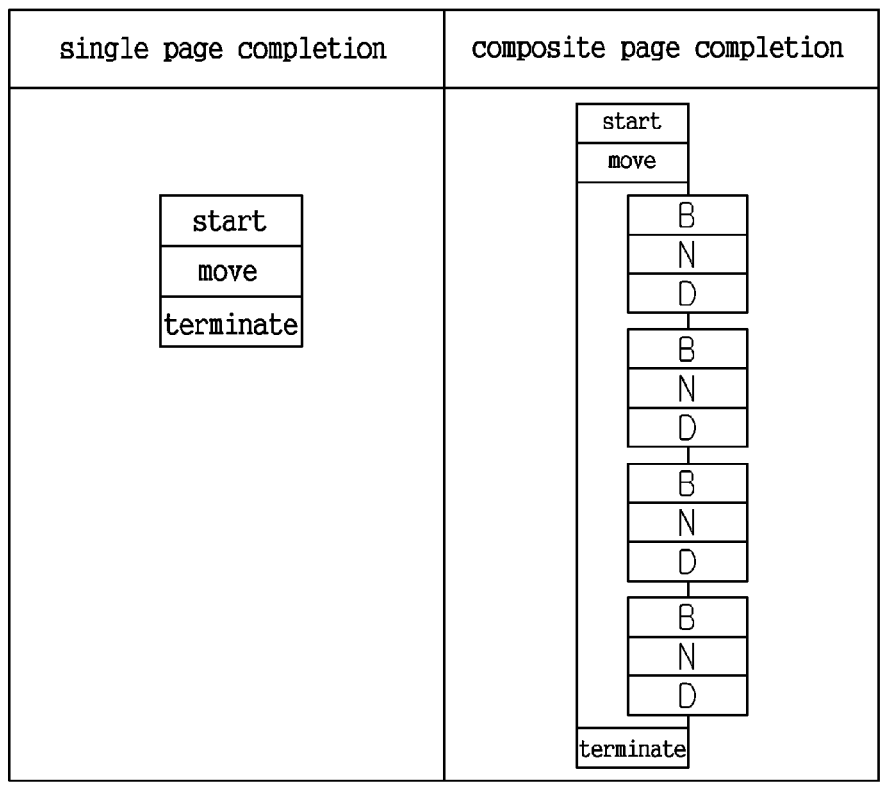
FIG. 6 is a view describing a process to ascertain whether pages are terminated.

FIG. 6 is a view describing a process ascertaining whether pages are terminated.

In the case of a single page, since a single page movement cycle is generated once and the single page does not include any subpage thereunder, it is determined whether a page is terminated by generating three types of movement messages, without recording an additional tree structure.

In the case of a complex page, since a plurality of subpage movement cycles are under the main page movement cycle, the main page and the subpage must be discriminated from each other. More specifically, when a main page movement start message is generated, subpage movement messages are generated, at random, according to the loading sequence, and all subpage movement process have been terminated, a document terminating message of the main page movement cycle is generated.

In this process, a complex page movement termination can be determined according to whether the main page document terminating message exists.

Figure 7:
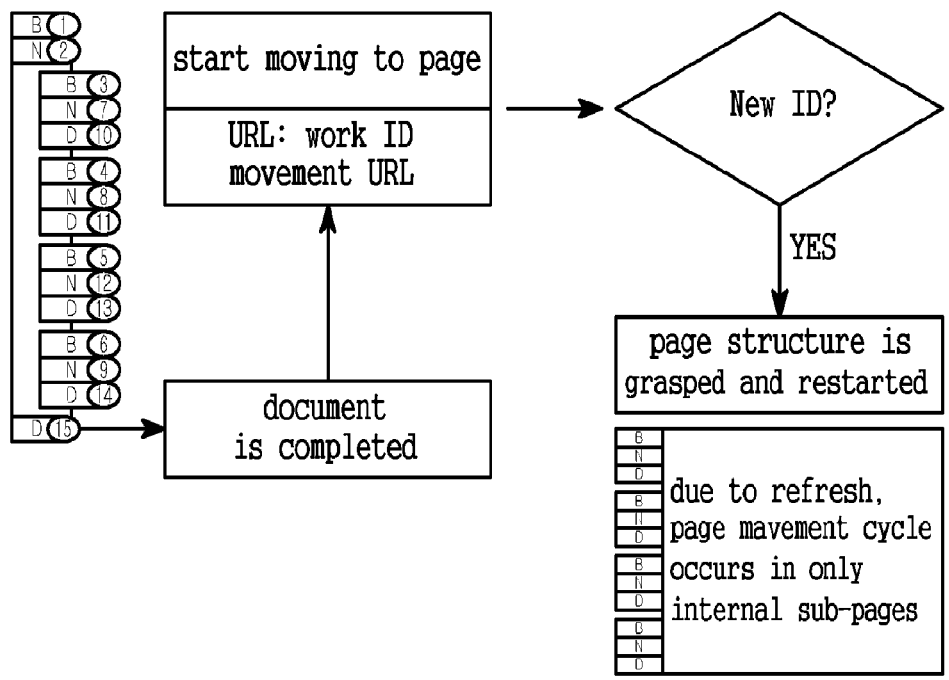
FIG. 7 is a view describing a process to determine whether a page is moved when a complex page is refreshed.

FIG. 7 is a view describing a process to detect whether a page is moved when a complex page is refreshed.

When a page tree structure, as shown in FIG. 5, is precisely prepared and then a corresponding web page is visited, the entire webpage structure can be easily determined.

In particular, since the complex page has a plurality of subpages thereunder, the subpages information is required to record, in detail, in the page tree structure in order to perform a managing operation, such as refresh, etc.

Referring to FIG. 7, when a refresh function is performed in the complex page, all subpages except for a main page are reloaded. In that case, IDs of a page movement cycle are newly generated. The newly generated IDs are different from the work IDs of previous pages.

Therefore, if the document terminating message is generated and then page movement start messages are generated again, it is checked whether a work ID is contained in a previously prepared page tree structure and whether a work ID is a main page ID. If a work ID is not contained in a previously prepared page tree structure and not a main page ID, it is determined that the complex page is refreshed.

Figure 8:
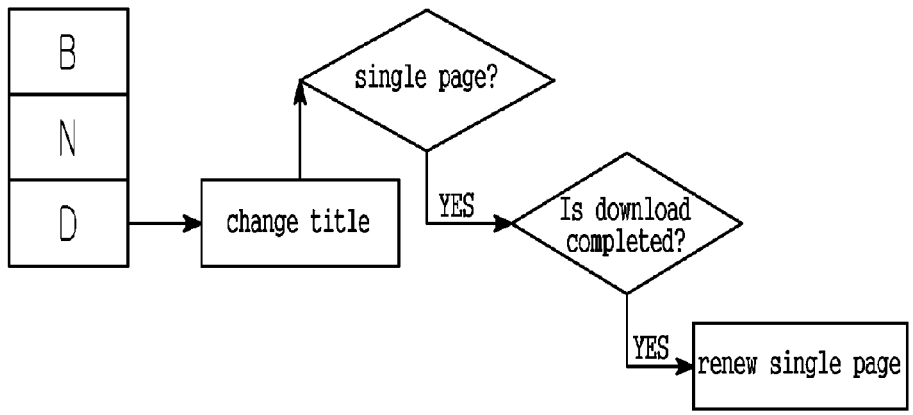
FIG. 8 is a view describing a process to determine whether a page is moved when a single page is refreshed.

FIG. 8 is a view describing a process to detect whether a page is moved when a single page is refreshed.

A single page does not contain any subpage itself. Therefore, unlike the complex page, it is impossible to determine whether a single page is refreshed by generating a subpage message. In order to resolve this problem, the following two messages are used.

TABLE 1

| Title alteration message | Download termination message |
|---|---|
| It is generated when the browser title is altered. | It is generated when contents inside pages have been downloaded. |

As described in the table above, a title alteration message is generated when a browser title is altered and a download termination message is generated when all contents inside the page have been downloaded.

In other words, when a single page is refreshed, a title alteration message is first generated. When a title alteration message is generated, in a state where a page movement start message is not generated after a page movement has been terminated, and when the structure of the page is also a single page, it is assumed that a situation exists where a page refresh may occur. That is, since a refresh is an operation that is performed after a web page has been already loaded, the state of the refresh is determined according to whether a subsequent message is generated after ascertaining that the web page is a single page and according to the type of subsequent message.

The refresh state of a single page can be determined according to a title alternation message or a download termination message indicating the decision of a document termination, without generating an additional movement start message after the document termination message is generated.

Here, the state where the title alteration message is generated is not determined as a page refresh but just assumed to be a page refresh. This is because the title alteration message may be generated on the page by a script correction, etc. Therefore, the title alteration is used to recognize only the expectation of a page movement start. When the title alteration message is generated and then a download termination message is generated, it is recognized that the page is refreshed.

Figure 9:
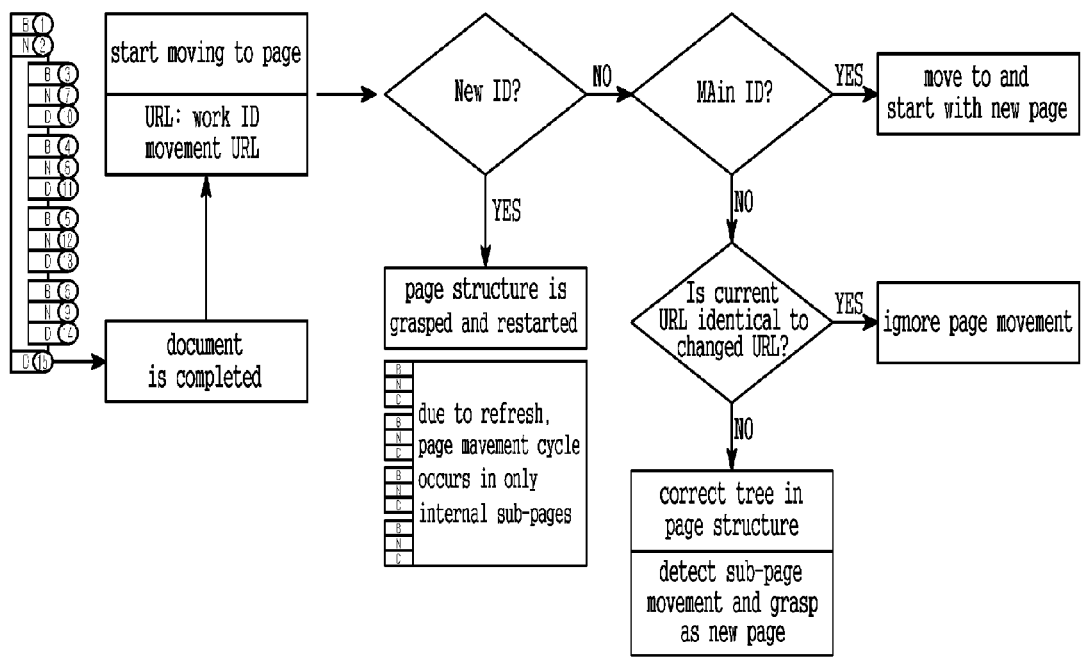
FIG. 9 is a view describing a process to determine whether a web page is moved when a subpage is altered and accordingly only the movement cycle of the subpage is altered.

FIG. 9 is a view describing a process to determine whether a web page is moved when a subpage is altered and accordingly only the movement cycle of the subpage is altered.

Websites can be designed to be operated as follows: a website is designed in such a way that the website information is displayed where the (webpage) board is implemented with internal frame so that only the internal board can be altered without changing the main page; and a website is designed in such a way that advertisements on a page are implemented with frames so that they can be replaced with others once at a certain period of time has elapsed.

In these two methods, the internal pages generate a page movement cycle. However, a user recognizes that a page is changed to another between before and after the first board is altered. On the contrary, although advertisements are modified, the user does not recognize that the page has changed to a new page. Therefore, when a subpage is moved, it is necessary to recognize whether the subpage is a new page or whether the movement is ignored.

When only a subpage is altered, a work ID is not issued to a subpage but instead a previous work ID is used. This work ID is used to search which page the subpage corresponds to in the page tree structure. When a new URL is different from the previously stored URL, it is recognized that the page has been altered. On the contrary, when a new URL is identical to the previously stored URL, the page alteration is ignored.

When a new URL is different from the previously stored URL, a subpage may be added thereto according to the new URL. In that case, the added subpage must be added to the page tree structure.

Through these processes, a specific user's web page movement path can be determined. In other words, when a message data base, which records data generated by collecting a specific user's web surfing movement path, is transmitted to the management server, it is analyzed to provide statistic data, such as the status of access to respective websites, a specific user's access path analysis, etc.

Also, when an indicator is attached to a web page, the management server collects information about the indicator and determines the data of the indicator and the information of the indicator about the attached position, etc.

More specifically, at a step of generating a document terminating message, it is determined whether the indicator has information to be transmitted. When it is ascertained that the indicator has information to be transmitted, information that a corresponding indictor exists is transmitted to the management server, together with the document terminating message. The management server allows the information that a corresponding indictor exists to be included in the message database.

When the document terminating message is generated, document information is transmitted to the management server; an indictor existing in a corresponding document is searched and re-transmitted; and an indicator is included in a web page and then displayed.

The conventional browser has difficulty determining the position and/or existence information of the indicator using only its structure. However, the method of the present invention can reproduce information about a precise position of the indicator attached to a particular web page through the existing information of an indicator, and collect this information to record/manage/store it in the management server, so that a target advertisement can be performed to users who use indicators and information, which cannot be obtained by the conventional log analysis, can be collected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described so far, it was described the construction and operation of METHOD FOR GRASPING INFORMATION OF WEB SITE THROUGH ANALYZING STRUCTURE OF WEB PAGE according to the present invention in the description and accompanying drawings, but the foregoing description and accompanying drawings are illustrative of preferred embodiments only, not limiting, and modifications and changes may be made in the illustrated embodiments without departure from the spirit of the present invention.

The invention claimed is:

1. A method for determining website information through web page structure analysis, comprising:
at a client,
generating, when a movement to a respective web page is initiated, a movement start message, the movement start message containing an ID that is issued to identify the respective web page;
generating, when the movement to the respective web page is terminated, a movement terminating message, the movement terminating message containing an indication of whether the respective web page is a main page or a subpage, based on a URL and the ID of the respective web page;
generating, when web page loading is completed, a document terminating message, the document terminating message containing analysis indicating a movement of which web page has been completed;
generating a message database by combining the movement start message, the movement terminating message, and the document terminating message; and
transmitting the message database to a server for analysis of the message database to determine the website information including a respective user's access information.

2. The method of claim 1, including:
when accessing a plurality of web pages,
generating a respective movement start message sequentially for a respective web page of the plurality of web pages;
generating a respective movement terminating message and a respective document terminating message in accordance with the sequence of loading respective web pages after the movement start message is generated for the respective web pages; and
storing, in the message database, information including a sequence of the generated messages.

3. The method of claim 1, wherein the generating the message database includes:
generating a tree structure of a plurality of web pages of a website, including a main page and subpages, from the generated messages; and
storing the tree structure of the website in the message database.

4. The method of claim 1, wherein the generating the movement start message includes:
at a server, determining whether the message database includes the ID for the respective web page, in order to determine whether the respective web page is visited for the first time.

5. The method of claim 1, further comprising:
when a complex web page is refreshed,
determining status of refresh by determining whether an ID issued to a subpage matches with an ID associated with a respective traversal start message included in the message database.

6. The method of claim 1, further comprising:
when a single web page is refreshed,
generating a title change message;
generating, when downloading of contents associated with the single web page is completed, a download terminating message; and
determining status of refresh based on whether the title change message and the download terminating message are respectively generated.

7. The method of claim 1, further comprising:
when only a subpage of a complex web page is changed:
identifying the ID issued to the subpage without creating an ID;
locating, in the message database, a web page corresponding to the ID issued to the subpage;
recognizing, when the URL for the subpage is different from the URL for the located web page, the difference as a change of the subpage.

8. The method of claim 1, wherein the generating the document terminating message further comprises:
determining that an indicator is attached to the web page; and
generating, when the indicator is attached, existence information, wherein the existence information indicates that the indicator is attached.

9. The method of claim 8, wherein:
the existence information comprises indicator location information and indicator content information; and
the existence information is stored in a database separate from the message database.

10. A system for determining website information through web page structure analysis, comprising:
a client:
one or more processors; and
one or more programs stored in the client and configured for execution by the one or more processors, the one or more programs comprising:
instructions for generating, when a movement to a respective web page is initiated, a movement start message containing an ID that is issued to identify the respective web page;

instructions for generating, when the movement to the respective web page is terminated, a movement terminating message containing an indication of whether the respective web page is a main page or a subpage, based on a URL and the ID of the respective web page;

instructions for generating, when web page loading is completed, a document terminating message containing analysis indicating a movement of which web page has been completed;

instructions for generating a message database by combining the movement start message, the movement terminating message, and the document terminating message; and instructions for transmitting the message database to a server for analysis of the message database to determine the website information including a respective user's access information.

11. The system of claim 10, the one or more programs comprising:

when accessing a plurality of web pages,
instructions for generating a respective movement start message sequentially for a respective web page of the plurality of web pages;

instructions for generating a respective movement terminating message and a respective document terminating message in accordance with the sequence of loading respective web pages after the movement start message is generated for the respective web pages; and instructions for storing, in the message database, information including a sequence of the generated messages.

12. The system of claim 10, wherein the instructions for generating the message database comprises:

instructions for generating a tree structure of a plurality of web pages of a website, including a main page and subpages, from the generated messages; and instructions for storing the tree structure of the website in the message database.

13. The system of claim 10, wherein the instructions for generating the movement start message includes:

instructions for determining, at a server, whether the message database includes the ID for the respective web page, in order to determine whether the respective web page is visited for the first time.

14. The system of claim 10, the one or more programs further comprising:

when a complex web page is refreshed,
instructions for determining status of refresh by determining whether an ID issued to a subpage matches with an ID associated with a respective traversal start message included in the message database.

15. The system of claim 10, the one or more programs further comprising:

when a single web page is refreshed,
instructions for generating a title change message;
instructions for generating, when downloading of contents associated with the single web page is completed, a download terminating message; and
instructions for determining status of refresh based on whether the title change message and the download terminating message are respectively generated.

16. The system of claim 10, the one or more programs further comprising:

when only a subpage of a complex web page is changed:
instructions for identifying the ID issued to the subpage without creating an ID;
instructions for locating, in the message database, a web page corresponding to the ID issued to the subpage;
instructions for recognizing, when the URL for the subpage is different from the URL for the located web page, the difference as a change of the subpage.

17. The system of claim 10, wherein the instructions for generating the document terminating message further comprises:

instructions for determining that an indicator is attached to the web page; and
instructions for generating, when the indicator is attached, existence information, wherein the existence information indicates that the indicator is attached.

18. The system of claim 17, wherein:
the existence information comprises indicator location information and indicator content information; and
the existence information is stored in a database separate from the message database.

19. A non-transitory computer readable medium storing one or more programs configured for execution by a computer, the one or more programs comprising instructions to:

generate, when a movement to a respective web page is initiated, a movement start message, the movement start message containing an ID that is issued to identify the respective web page;

generate, when the movement to the respective web page is terminated, a movement terminating message, the movement terminating message containing an indication of whether the respective web page is a main page or a subpage, based on a URL and the ID of the respective web page;

generate, when web page loading is completed, a document terminating message, the document terminating message containing analysis indicating a movement of which web page has been completed;

generate a message database by combining the movement start message, the movement terminating message, and the document terminating message; and transmit the message database to a server for analysis of the message database to determine the website information including a respective user's access information.

* * * * *